Figure 1:
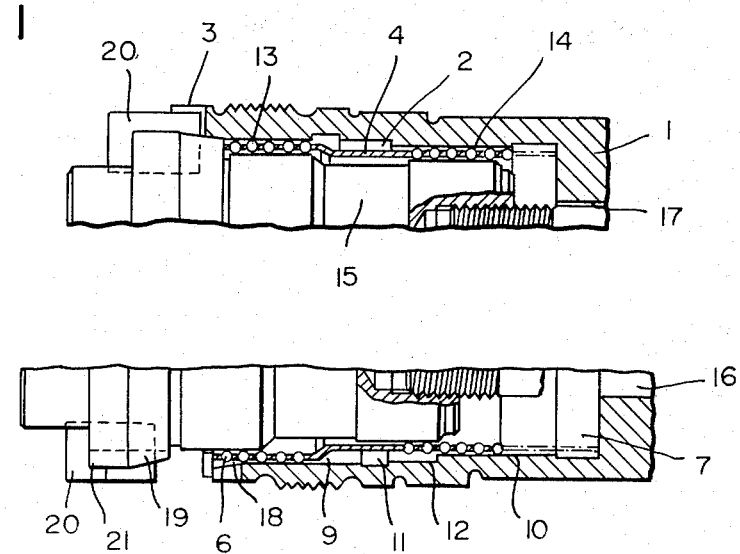

United States Patent [19]
Hanak et al.

[11] 3,774,928
[45] Nov. 27, 1973

[54] CENTERING SPINDLE FOR TAKING UP TOOL SHAFTS
[75] Inventors: Gerhard Hanak, Bammental; Heinrich Hubert, Neckargemund; Hans Kuhnert, Wiesloch, all of Germany
[73] Assignee: Heidelberger Druckmaschinen Aktiengesellschaft, Heidelberg, Germany
[22] Filed: Nov. 19, 1971
[21] Appl. No.: 200,481

[30] Foreign Application Priority Data
Nov. 18, 1970 Germany.................. P 20 56 683.0

[52] U.S. Cl................... 279/22, 279/30, 90/11 A, 408/238
[51] Int. Cl................... B23b 29/00, B23q 3/12
[58] Field of Search.................. 279/1 R, 22, 1 L, 279/30, 9, 102, 103, 91, 75; 408/238; 90/11 A

[56] References Cited
UNITED STATES PATENTS
3,120,765 2/1964 Briney et al. ................ 90/11 A
3,521,896 7/1970 Matsumoto ..................... 279/91

Primary Examiner—Francis S. Husar
Attorney—Arthur E. Wilfond et al.

[57] ABSTRACT

Centering spindle comprises a working spindle, a takeup bore having a tool shaft receiving aperture in the working spindle, a bearing cage slidably disposed in the bore, the bore being in part comprised of bearing cage supporting wall portions, the wall portions having inside diameters of different magnitudes in respect to the longitudinal axis of the bore, the bore further comprising a short inwardly tapering portion corresponding to a complementary frusto-conical formation on a tool shaft to be inserted thereinto.

5 Claims, 2 Drawing Figures

CENTERING SPINDLE FOR TAKING UP TOOL SHAFTS

The present invention relates to a centering spindle for taking up tool shafts, the clearance between the take-up bore of the centering spindle and the respective tool shaft introduced therein being taken up by ball bearings.

Centering spindles are known wherein the take-up bore is provided with a cage accommodating series of ball bearings. The ball bearings of this cage are provided for the holding of a tool shaft introduced thereinto. The fit between the coacting parts, that is, tool shaft, balls, and take-up bore, constitutes a negative clearance. Means are further provided whereby the tool shaft is always held in the same angular position with respect to the longitudinal axis of the tool within the centering spindle. (German published Patent application No. 1,402,197).

The known centering spindle, also called tool take-up, possesses a number of advantages. For instance, operating precision with its use is extremely high for boring tools and drill rods. Dirt and small foreign bodies which, during tool changes, are frequently introduced between the tool shaft and the take-up bore, cannot impair the precision of the work. Furthermore, the influence of impacts in the direction of the longitudinal tool axis is without any injurious influence on the working precision, since the tool is always held in the same angular position in the take-up bore.

The repeatability in the known tool take-up of the ability of holding the tool, that is, the precision of the position of the cutting edge of the tool in respect to the working spindle after several tool changes, is very satisfactory.

The known centering spindle, however, has also some disadvantages.

As a result of the introduction of the tool shaft into the take-up bore, the ball bearings and the ball carrying cage move into the take-up bore in the direction of the insertion of the tool. As a consequence, the tool shaft, when inserted, is not enclosed by the balls over its entire length and the first row of ball bearings is positioned a certain distance behind the forward edge of the take-up bore. If tools are introduced during the application of which strong radial forces operate on the shaft, as, for instance, in the case of milling tools, the stability of the known tool take-up is not satisfactory. Furthermore, due to the migration of the ball bearings during the introduction of the tool shaft, the extent of tool projection, that is, the length from the tool tip to the forward point of the take-up bore, is unnecessarily increased.

It is an object of the invention to provide a centering spindle which, while retaining the above described advantages of the known arrangements, firmly encloses the tool shaft immediately at the entry to the take-up bore and thereby bestows a high stability upon the tool, especially for work in which strong radial forces are present. Furthermore, the extent of the rollaway movement of the ball bearings is to be shortened.

The object is attained in that the wall of the take-up bore which holds the cage containing the ball bearings, after the introduction of a tool shaft is broken by radial recesses, for instance, annular grooves or stepped changes in diameter, and in that between the bearing wall and the aperture of the take-up bore, there is provided a short tapered portion into which fits a corresponding short taper on the tool shaft.

The interruption in the bearing wall of the take-up bore shortens the required extent of the run-in of the ball cage and the tapered portion within the take-up bore, together with the taper on the tool shaft, produces a solid connection in the immediate vicinity of the tool cutting edge. Due to this arrangement, the centering spindle in accordance with the invention is particularly suitable for machine tools with automatic tool change, since it is practically unaffected by any dirt and furthermore provides the greatest possible stability.

As is known, such tool changers receive, in turn, a plurality of different tools from the same working spindle. The tool take-up of the tool changer must therefore be of such a nature that even with longer operating time and unfavorable conditions due to tool changes, as well as due to heavier loading because of the cutting forces with roughing work, no impairment of the take-up should occur for finishing work, such as precision turning of drill rods.

An embodiment of the invention consists in that the bearing wall of the take-up bore consists of at least two about equally long bore sections of different diameters, wherein the bore section having the respectively larger diameter is disposed closer to the aperture of the take-up bore, and that the ball cage corresponds to the form of the take-up bore wall, the intervals between the front and back rows of ball bearings of the individual sections being equal, and that the tool shaft corresponds to the form of the ball cage.

Thus, the roll-away path of the balls, as compared to that of the known arrangement, has been drastically shortened. With a centering spindle as shown in German DOS No. 1,402,197, the ball cage actually projects out of the take-up bore by about half of the insertion length of the tool shaft, since the roll-away path of the balls amounts to one half of the insertion length of the tool shaft. A ball cage, however, which extends outside of the take-up bore, may very easily be damaged.

An embodiment in accordance with the invention makes possible a shortening of the roll-off path of the ball bearings to more than a quarter of the insertion length of the tool shaft. Thereby and also because of the taper on the tool shaft, the centering spindle may be constructed in such a way, that the ball cage itself, in the no-load position, may be completely contained within the take-up bore.

In a further especially advantageous embodiment of the invention, there are provided within the supporting wall of the take-up bore, annular grooves at intervals corresponding to those of the series of ball bearings of the ball cage. The number of the annular grooves is one less than the number of the series of ball bearings, so that only one row of ball bearings, preferably the one positioned adjacent to the end of the take-up bore, makes contact with the supporting wall of the take-up bore during the no-load position of the ball cage.

The roll-away path of the ball bearings of the ball cage in this particular embodiment need only be of the order of magnitude of the ball diameters. In order to obtain a solid hold on the tool shaft, it is only necessary that the balls opposite to the annular slots exceed the slot shoulders in the direction of the end of the take-up bore by a few millimeters.

Figure 2:
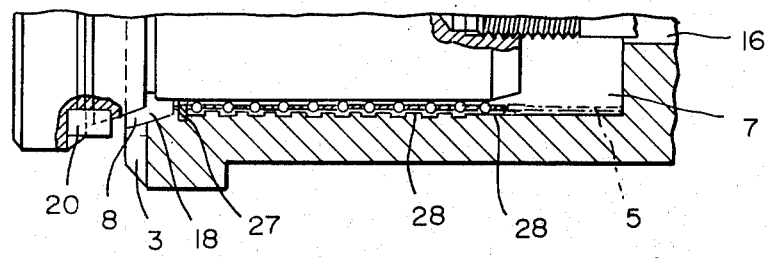

With these and other objects in view, which will become apparent in the following detailed description, the present invention will be clearly understood in connection with the accompanying drawings, in which:

FIG. 1 shows a centering spindle, with a take-up bore having a single step-down formation, and FIG. 2 shows a centering spindle in accordance with the invention, the take-up bore of which is provided with annular grooves.

The lower halves of both of the FIGS. 1 and 2 illustrate respectively the beginning of the insertion of a tool shaft thereinto. In contrast thereto, the upper halves of the said figures illustrate the moment at which the introduction of the tool shaft has been concluded.

The centering spindle according to FIG. 1 is disposed at the free end of the working spindle 1. The centering spindle is provided with a take-up bore 2 and possesses at its front side two diametrically opposed key slots 3. A ball cage 4 is disposed axially adjustable within the take-up bore 2 and is held against a detent 6 by means of a pressure spring 5. The pressure spring 5 is braced at the take-up bore end 7. The said detent 6 is arranged immediately adjacent to the aperture 8 of the take-up bore 2.

The take-up bore 2 has two bearing walls 9 and 10, of which wall 10 is disposed closer to the take-up bore end 7 and has a smaller diameter. The length of the two supporting walls 9 and 10 is about equal. The two walls are separated from each other by means of recesses 11 and 12. The ball cage 4 corresponds in shape to the step-down formation of the take-up bore 2. The bore includes two groups 13 and 14 of serially or spirally arranged balls. The group of balls 13 which is disposed closer to the aperture 8, in correspondence to the larger diameter of the supporting wall 9, possesses a larger partial circle diameter than that of ball group 14. The distance between the first and last row of ball bearings is the same for both ball groups 13 and 14. The tool shaft 15, which is to be inserted, has the same stepped-down shape as the ball cage. The tool shaft, at its forward end, is connected with a tie rod 16 which extends through a bore 17 provided at the bore end 7.

Between the supporting wall 9 and the aperture 8 there is provided a take-up bore 2, which consists of an inwardly tapering portion 18, into which fits short taper 19 of the tool shaft 15. Within the range of the said short taper 19, the tool shaft 15 includes two opposed and diametrically extending slot keys 20 which coact with the slots 3.

As tool shaft 15 is introduced into the ball cage 4 of the take-up bore 2, a press fit develops between the tool shaft 15, the ball groups 13,14 and the supporting walls 9 and 10 of the take-up bore 2. Due to the insertion movement, the ball bearing groups 13 and 14 between the tool shaft and the supporting walls 9 and 10 roll away and effect a movement of the ball cage 4 into the take-up bore 2.

As already explained, during its no load position, the ball cage 4 contacts stop or detent 6. In this position, only about half of the ball groups 13 and 14 are disposed opposite the supporting walls 9 and 10. Consequently, tool shaft 15 may be inserted into the take-up bore 2 by more than one half of its length without the ball cage 4 being set into motion thereby. A roll-away movement of the balls and thereby a displacement of the ball cage 4 into the take-up bore 2 takes place only when the two step-down sections of the tool shaft 15 encounter the respective first row of balls which contact the two supporting walls 9 and 10. The path of the ball cage 4 corresponds to the above from the moment it is carried along at the mid-point of the remaining insertion path of the tool shaft 15.

Due to the fact that the ball groups 13 and 14 are arranged in the forward range of the take-up bore 2 in a larger partial circle and in a smaller partial circle in the rearward range, it is possible to keep the rollaway path of ball groups 13 and 14 relatively short and thereby to shorten the insert path of the ball cage 4. An additional bracing support of the tool shaft 15 in the take-up bore 2 is obtained by means of the joining of said taper 19 of the tool shaft 15 with the conical portion 18 of the take-up bore 2.

As illustrated in the upper half of FIG. 1, the slot keys 20 intrude into the key slots 3 as soon as the tool shaft 15 has been fully inserted into the take-up bore 2. In addition, detent or stop 6 penetrates into an adjusting slot 21 which extends through the taper 19. Extending the detent 6 into the said adjusting slot 21 makes it impossible for the tool shaft to be pushed into the take-up bore in two different positions. The protection of the tool shaft against any rotation is, on the one hand, effected by the slot keys 20 and also by the taper 19. In order also to protect the inserted tool shaft 15 against falling out, a pulling force is applied in the direction of the take-up bore end 7 by means of the tie rod 16.

As shown in FIG. 2, the centering spindle, in accordance with the invention, is also arranged at the free end of a working spindle 1. The take-up bore 2 in this case, however, does not have any step-down, but, instead, is provided with annular slots 25. Within the range of the aperture 8, there are again to be found the slots 3 extending diametrically and disposed in juxtaposition to one another, in the range of which there is provided the conical section 18 which coacts with the taper 19 of the tool shaft 15. The slot keys 20 of the tool shaft 15, during the insertion of the tool shaft into the take-up bore 2, extend into the said slots 3 and thereby provide a bar against rotational movement. The slots 3 and the corresponding slot keys 20 may have different width so that an insertion of the tool shaft into the take-up bore 2 is made possible only in a predetermined angular position.

Conforming to the shape of the take-up bore 2, the ball cage 4 is formed cylindrically and includes a series of ball bearings 26 which are disposed on the same part-circle-diameter. The bearings 26 are uniformly distributed in rows on the circumference of the ball cage. A pressure spring 5 which is supported at the take-up-bore end 7, presses ball cage 4 against the stop ring 27, as long as no tool shaft 15 has been introduced. This situation is illustrated in the lower half of FIG. 2. Here, the ball bearings 26 of the ball cage 4 are disposed in opposition to the annular slots 25 mentioned hereinabove, thus not making contact with the supporting wall 28 of the take-up bore 2. Since, however, the number of the annular slots is less by one than the number of the ball bearing rows of the ball cage, the bearings 26 of that series of bearings which is disposed the furthest within the take-up bore 2, adjoin the supporting wall 28.

As the cylindrical tool shaft 15 is introduced into the take-up bore 2, or rather into the ball cage 4, the ball cage is carried along thereby only at that moment when its forward end reaches the last series of bearings which is supported on the bearing wall 28. At this moment, the ball cage 4 moves in the direction of the take-up bore end 7 against the force of the spring 5. The bearings 26 of the ball cage 4, which so far have not taken up the load, thereby travel past that shoulder of the respective juxtaposed annular slot which faces the take-up bore end 7 and are thereby supported by the bearing wall 28. A press fit is thereby established between this bearing wall 28, the balls 26 and the tool shaft 15.

Since the bearings 26 must be brought out of the respective range of the annular slot 25 respectively lying in opposition thereto, the roll-away path necessary for obtaining a rigid mounting amounts to only a few millimeters. After the introduction of the tool shaft 15 into the take-up bore 2, the tie rod 16 is tightened. Thus, a falling out of the tool shaft from the centering spindle is no longer possible.

The tool take-up shown in FIG. 2 is insofar more advantageous than the form shown in FIG. 1, in that the tool shaft 15 is enclosed by more bearings and, moreoever, may be fabricated much more simply and reasonably.

Since, due to the bearings, a press fit may be obtained between tool shaft 15 and the take-up bore 2, a further embodiment of the invention may be utilized in the following additional manner:

Due to the press fit, radial forces act on the take-up bore 2 of the working spindle 1 and effect a deformation of the working spindle 1 in such a manner that the outside diameter of the working spindle becomes larger within the range in which bearings in the take-up bore 2 are present. This leads to a decrease in the bearing play of the working spindle 1.

Since, for various tools, the spindle support is subject to different requirements and conditions as, for instance, high rotational speeds, high precision, and small loading for finishing work; low rotational speeds, low precision and high loads for rough work, the bearing play of the spindle may be made to suit the respective requirements of the tool by means of diameter stepdowns of the various tool shafts.

The bearing play of the working spindle may also be generally adjusted in that the entire ball cage 24 is exchanged against a cage with larger or smaller bearings. The invention is not limited to a cylindrical take-up. It is, for instance, possible to conceive of a four-sided type take-up in which, instead of ball bearings, cylindrical rollers are used between the tool shaft and the take-up. In such an embodiment, very high load carrying capacity is obtained through the line type contact of the rollers and a good damping is obtained. Moreoever, prevention of a rotational movement through slots and slot keys is not required.

While we have disclosed several embodiments of the present invention, it is to be understood that these embodiments are given by example only and not in a limiting sense, the scope of the present invention being determined by the objects and the claims.

It is claimed:

1. Centering spindle comprising a working spindle, a take-up bore having a tool shaft receiving aperture formed in said working spindle, a bearing cage slidably disposed in said bore, said bore being in part defined by supporting wall portions for said bearing cage, said bore further comprising a short, inwardly tapering portion corresponding to a complementary frusto-conical formation on a tool shaft insertable therein, said supporting wall portions being formed with a multiplicity of axially extending annular grooves, the distance between said grooves corresponding respectively to that of rows of ball bearings carried in said ball cage, the number of grooves being one less than that of said rows of ball bearings, so that only one row of ball bearings makes contact with a supporting wall portion in a no-load position of said bearing cage.

2. Centering spindle according to claim 1, further including means for yieldingly maintaining said cage in said bore, said cage being pressure held against a stop adjacent the aperture of said bore during no-load.

3. Centering spindle according to claim 1, further including means for effecting a pull into the take-up bore on a tool shaft inserted therein.

4. Centering spindle according to claim 1, further including key ways on one face of said spindle for coaction with keying pieces on the tool shaft, whereby rotation of the tool shaft relative to the bore is prevented.

5. Centering spindle according to claim 2, further including means for locking the tool shaft in said bore in a fixed angular position in relation to the longitudinal axis of the take-up bore.

* * * * *